United States Patent
Kurihara et al.

(10) Patent No.: US 11,320,168 B2
(45) Date of Patent: May 3, 2022

(54) AIR-CONDITIONING APPARATUS

(71) Applicant: Mitsubishi Electric Corporation, Tokyo (JP)

(72) Inventors: Makoto Kurihara, Tokyo (JP); Yoshitaka Uno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 98 days.

(21) Appl. No.: 16/967,530

(22) PCT Filed: Mar. 1, 2018

(86) PCT No.: PCT/JP2018/007741
§ 371 (c)(1),
(2) Date: Aug. 5, 2020

(87) PCT Pub. No.: WO2019/167222
PCT Pub. Date: Sep. 6, 2019

(65) Prior Publication Data
US 2021/0215369 A1   Jul. 15, 2021

(51) Int. Cl.
*F24F 11/63* (2018.01)
*F24F 11/76* (2018.01)
(Continued)

(52) U.S. Cl.
CPC .............. *F24F 11/63* (2018.01); *F24F 11/52* (2018.01); *F24F 11/76* (2018.01); *F24F 11/79* (2018.01);
(Continued)

(58) Field of Classification Search
CPC .. F24F 11/63; F24F 11/52; F24F 11/76; F24F 11/79; F24F 11/86; F24F 2110/10;
(Continued)

(56) References Cited

U.S. PATENT DOCUMENTS 10,436,467 B2 * 10/2019 Lee .................... G05D 23/1917
2013/0085609 A1 * 4/2013 Barker ................. H05B 47/115
700/276
(Continued)

FOREIGN PATENT DOCUMENTS

| CN | 105371435 A | 3/2016 |
| CN | 106016636 A | 10/2016 |

(Continued)

OTHER PUBLICATIONS

International Search Report of the International Searching Authority dated Jun. 5, 2018 for the corresponding International application No. PCT/JP2018/007741 (and English translation).
(Continued)

*Primary Examiner* — Ramesh B Patel
(74) *Attorney, Agent, or Firm* — Posz Law Group, PLC (57) ABSTRACT

An air-conditioning apparatus includes; an air temperature detection unit configured to detect air temperature in an air-conditioned space; a human body detection unit configured to detect human bodies in the air-conditioned space; an estimation unit configured to estimate thermal sensation of persons detected by the human body detection unit; and a control unit configured to correct a value of the air temperature or set temperature based on the thermal sensation of all of the detected persons estimated by the estimation unit, and to control a refrigeration cycle by using the corrected value.

9 Claims, 5 Drawing Sheets

(51) Int. Cl.
*F24F 11/79* (2018.01)
*F24F 11/86* (2018.01)
*F24F 11/52* (2018.01)
*G05B 15/02* (2006.01)
*F24F 110/20* (2018.01)
*F24F 120/12* (2018.01)
*F24F 110/10* (2018.01)

(52) U.S. Cl.
CPC .............. *F24F 11/86* (2018.01); *G05B 15/02* (2013.01); *F24F 2110/10* (2018.01); *F24F 2110/20* (2018.01); *F24F 2120/12* (2018.01)

(58) Field of Classification Search
CPC .... F24F 2110/20; F24F 2120/12; F24F 11/64; F24F 11/80; F24F 1/0007; G05B 15/02
See application file for complete search history.

(56) References Cited

U.S. PATENT DOCUMENTS

| | | | |
|---|---|---|---|
| 2015/0204561 A1* | 7/2015 | Sadwick | ................... F24F 11/30 236/1 C |
| 2016/0054021 A1* | 2/2016 | Lee | ........................... F24F 11/64 700/276 |
| 2017/0238401 A1* | 8/2017 | Sadwick | ............. H05B 47/195 315/294 |
| 2018/0299155 A1* | 10/2018 | Walsh | ...................... F24F 11/46 |
| 2019/0209806 A1* | 7/2019 | Allen | ...................... G16H 20/70 |

FOREIGN PATENT DOCUMENTS

| | | |
|---|---|---|
| EP | 2 292 986 A2 | 3/2011 |
| JP | H07-055228 A | 3/1995 |
| JP | H08-128694 A | 5/1996 |
| JP | 2001-174022 A | 6/2001 |
| JP | 2011-027305 A | 2/2011 |
| JP | 2016-090176 A | 5/2016 |
| JP | 2016-200373 A | 12/2016 |
| JP | 2017-015384 A | 1/2017 |
| WO | 2013/073372 A1 | 5/2013 |

OTHER PUBLICATIONS

Extended European Search Report dated Feb. 1, 2021, issued in corresponding EP Patent Application No. 18908089.8.
Office Action dated Aug. 11, 2021, issued in corresponding CN Patent Application No. 201880090208.3 (and English Machine Translation).
Office Action dated Mar. 29, 2021 issued in corresponding CN patent application No. 201880090208.3 (and English translation).
Examination Report dated Mar. 31, 2021 issued in corresponding AU patent application No. 2018411164.
Decision of Rejection dated Jan. 17, 2022, issued in corresponding CN Patent Application No. 201880090208.3 (and English Machine Translation).

* cited by examiner

| PMV | SEVEN-STAGE EVALUATION |
|---|---|
| +3 | HOT |
| +2 | WARM |
| +1 | LITTLE WARM |
| 0 | NEUTRAL |
| −1 | LITTLE COOL |
| −2 | COOL |
| −3 | COLD |

FIG. 7

PERSONS A TO E IN AIR-CONDITIONED SPACE

FIG. 8

|  | PERSON WITH HIGHEST THERMAL SENSATION | PERSON WITH LOWEST THERMAL SENSATION |
|---|---|---|
| HOT |  |  |
| WARM |  |  |
| COMFORTABLE |  |  |
| COOL | ○ |  |
| COLD |  | ○ |

FIG. 9

|  | PERSON WITH HIGHEST THERMAL SENSATION | PERSON WITH LOWEST THERMAL SENSATION |
|---|---|---|
| HOT |  |  |
| WARM |  |  |
| COMFORTABLE | O |  |
| COOL |  | O |
| COLD |  |  |

FIG. 10

|  | PERSON WITH HIGHEST THERMAL SENSATION | PERSON WITH LOWEST THERMAL SENSATION |
|---|---|---|
| HOT | O |  |
| WARM |  | O |
| COMFORTABLE |  |  |
| COOL |  |  |
| COLD |  |  |

FIG. 11

|  | PERSON WITH HIGHEST THERMAL SENSATION | PERSON WITH LOWEST THERMAL SENSATION |
|---|---|---|
| HOT |  |  |
| WARM | O |  |
| COMFORTABLE |  | O |
| COOL |  |  |
| COLD |  |  |

AIR-CONDITIONING APPARATUS

CROSS REFERENCE TO RELATED APPLICATION

This application is a U.S. national stage application of PCT/JP2018/007741 filed on Mar. 1, 2018, the contents of which are incorporated herein by reference.

TECHNICAL FIELD

The present disclosure relates to an air-conditioning apparatus including a refrigerant circuit.

BACKGROUND ART

It is proposed that, in a related art air-conditioning apparatus, a thermal sensation estimated value is calculated from measurement data of skin temperature at an arm of a person, and rotation speed of a compressor is controlled based on deviation between the calculated thermal sensation estimated value and a thermal sensation target value to perform air conditioning (for example, see Patent Literature 1).

Further, an air-conditioning apparatus that calculates sensory temperature from radiant heat temperature detected by an infrared sensor, compares the sensory temperature and threshold temperature, and in a case where the sensory temperature is lower than the threshold temperature, determines the sensory temperature as being sufficiently low, and corrects set temperature to a value higher than current temperature has been proposed (for example, see Patent Literature 2).

CITATION LIST

Patent Literature

Patent Literature 1: Japanese Unexamined Patent Applicaion Publication No. 08-128694
Patent Literature 2: Japanese Unexamined Patent Application Publication No. 2011-027305

SUMMARY OF INVENTION

Technical Problem

The technologies disclosed in Patent Literatures 1 and 2 estimate the thermal sensation from the skin temperature at the arm or the indoor radiant heat temperature, determines the deviation between the estimated thermal sensation and the thermal sensation target value, and controls the air-conditioning apparatus. These technologies are made without considering a case where a plurality of persons are present in an air-conditioned space, and it is difficult to apply these technologies to control that improves thermal sensation of the plurality of persons in the air-conditioned space.

The present disclosure is made to solve the above-described problems, and provides an air-conditioning apparatus that makes all of a plurality of persons in an air-conditioned space more comfortable in respect of thermal sensation.

Solution to Problem

An air-conditioning apparatus according to an embodiment of the present disclosure includes: an air temperature detection unit configured to detect air temperature in an air-conditioned space; a human body detection unit configured to detect human bodies in the air-conditioned space; an estimation unit configured to estimate thermal sensation of persons detected by the human body detection unit; and a control unit configured to correct a value of the air temperature or set temperature based on the thermal sensation of all of the detected persons estimated by the estimation unit, and to control a refrigeration cycle by using the corrected value.

Advantageous Effects of Invention

According to the embodiment of the present disclosure, when the plurality of persons in the air-conditioned space are detected, thermal sensation of all of the detected persons are estimated, the air temperature or the set temperature is corrected based on the thermal sensation of all of the detected persons, and the refrigeration cycle is controlled with the corrected value. This makes it possible to make all of the detected persons more comfortable in respect of thermal sensation.

DESCRIPTION OF EMBODIMENTS

Embodiment 1

Figure 1:
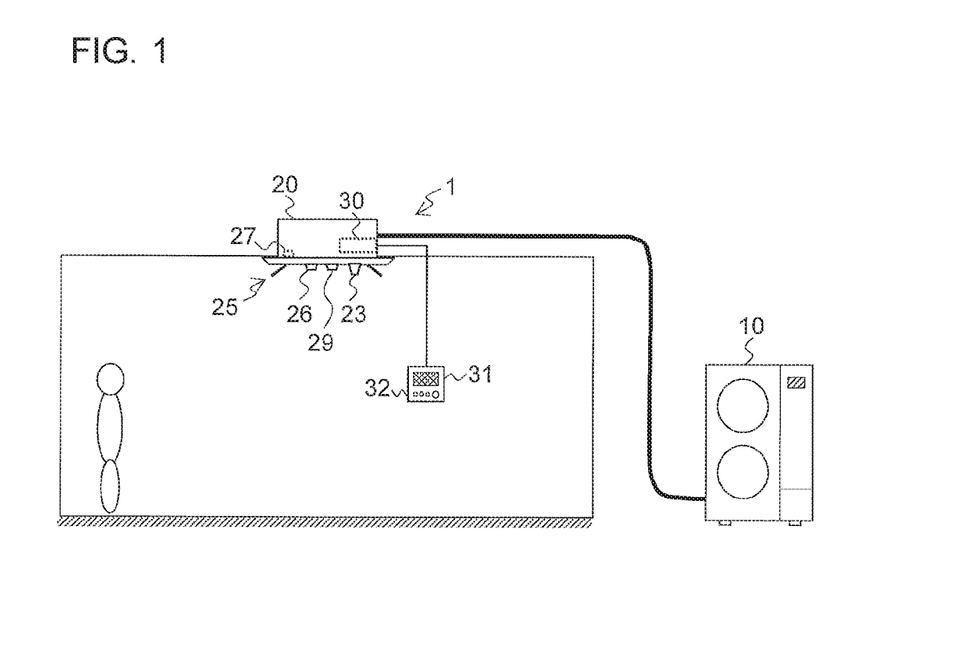
FIG. 1 is a diagram illustrating a configuration example of an air-conditioning apparatus according to Embodiment 1 of the present disclosure.
Figure 2:
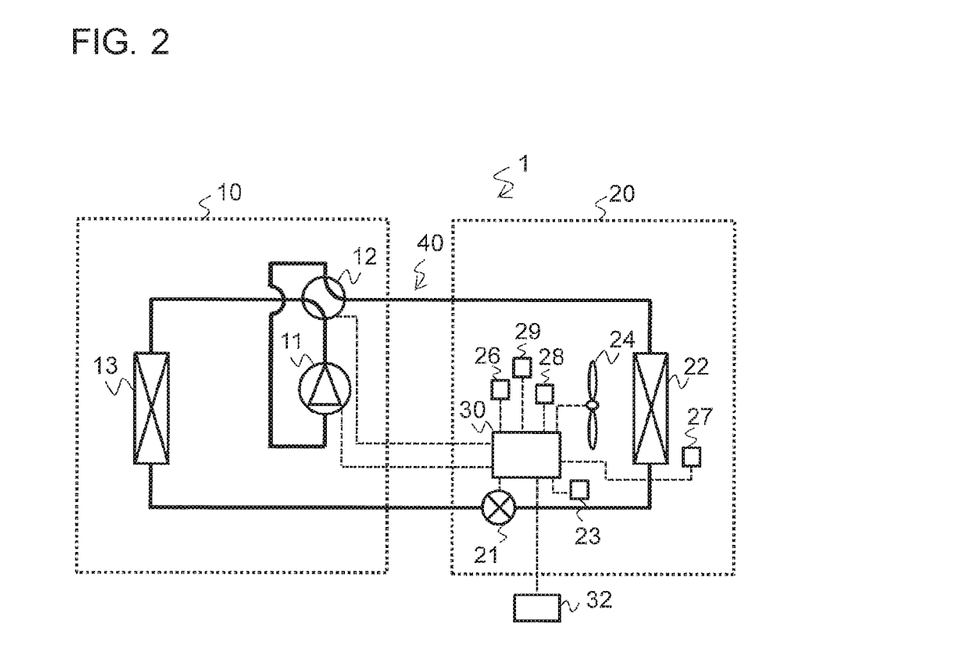
FIG. 2 is a refrigerant circuit diagram of the air-conditioning apparatus illustrated in FIG. 1.

A configuration of an air-conditioning apparatus of Embodiment 1 will be described. FIG. 1 is a diagram illustrating a configuration example of the air-conditioning apparatus according to Embodiment 1 of the present disclosure, FIG. 2 is a refrigerant circuit diagram of the air-conditioning apparatus illustrated in FIG. 1. As illustrated in FIG. 1, the air-conditioning apparatus 1 includes a heat source-side unit 10 and a load-side unit 20. As illustrated in FIG. 2, the heat source-side unit 10 includes a compressor 11, a flow switching device 12, and a heat source-side heat exchanger 13. FIG. 1 illustrates a case where air outlets for conditioned air of the load-side unit 20 are directed to two directions; however, the number of air outlets is not limited to two. Further, FIG. 1 illustrates a case where the load-side unit 20 is of a ceiling cassette type; however, the load-side unit 20 is not limited to this type. The load-side unit 20 may be of a wall hanging type or a floor installation type.

The compressor 11 is, for example, an inverter compressor changeable in capacity, and compresses refrigerant and discharges the compressed refrigerant. The flow switching device 12 switches a flow direction of refrigerant based on an operation mode such as heating operation and cooling operation. The flow switching device 12 is, for example, a four-way valve. The heat source-side heat exchanger 13 is a heat exchanger that causes heat exchange to be performed between the refrigerant and outdoor air.

As illustrated in FIG. 1 and FIG. 2, the load-side unit 20 includes an expansion device 21, a load-side heat exchanger 22, a human body detection unit 23, an air volume adjustment unit 24, an air direction adjustment unit 25, an air temperature detection unit 26, a blowout temperature detection unit 27, a floor temperature detection unit 28, a humidity detection unit 29, and a control unit 30. An operation unit 32 including a display unit 31 is connected to the control unit 30.

The expansion device 21 decompresses and expands the refrigerant. The expansion device 21 is, for example, an electronic expansion valve. The load-side heat exchanger 22 is a heat exchanger that causes heat exchange to be performed between the refrigerant and indoor air. The air volume adjustment unit 24 sucks the air from the inside of the room to cause the load-side heat exchanger 22 to perform heat exchange and adjusts a blowout air volume when the heat-exchanged air is returned to the inside of the room. The air volume adjustment unit 24 is, for example, a fan variable in rotation speed. The compressor 11, the heat source-side heat exchanger 13, the expansion device 21, and the load-side heat exchanger 22 are connected by refrigerant pipes to configure a refrigerant circuit 40 through which the refrigerant circulates.

The human body detection unit 23 detects human bodies from difference between temperature of the indoor air and temperature of the human bodies. Further, the human body detection unit 23 detects positions of the human bodies with a position of the own apparatus as a reference position. The human body detection unit 23 is, for example, an infrared sensor. The air direction adjustment unit 25 adjusts a direction of the blowout air from the air volume adjustment unit 24. The air direction adjustment unit 25 is, for example, a louver.

The air temperature detection unit 26 detects air temperature Tr in the room that is the air-conditioned space. The blowout temperature detection unit 27 detects blowout temperature of the air blown out from the air volume adjustment unit 24. The floor temperature detection unit 28 detects floor temperature. The floor temperature detection unit 28 is, for example, an infrared sensor. The humidity detection unit 29 detects indoor air humidity.

Figure 3:
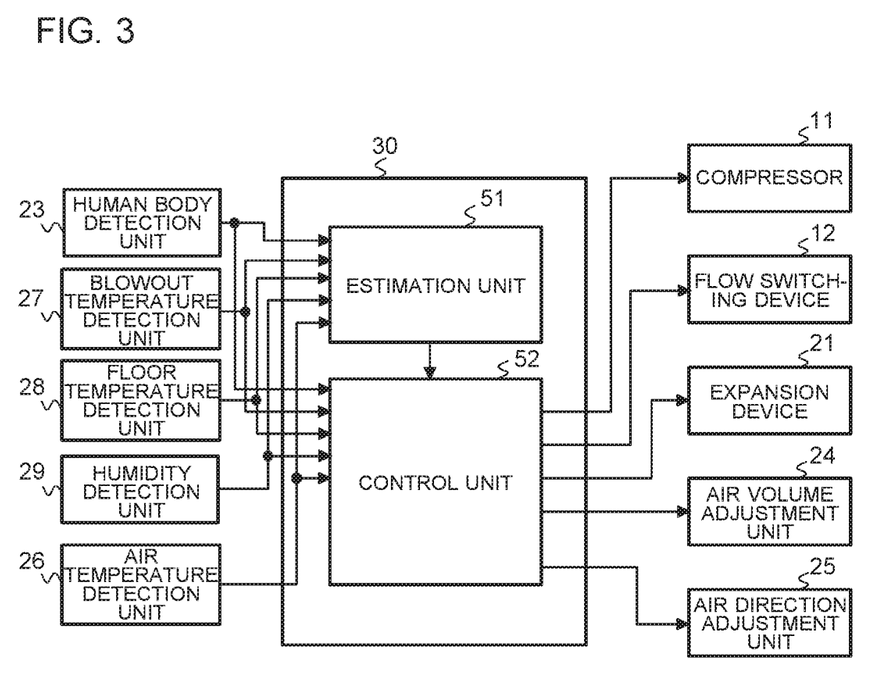
FIG. 3 is a functional block diagram illustrating a configuration example of a control unit illustrated in FIG. 2.

FIG. 3 is a functional block diagram illustrating a configuration example of the control unit illustrated in FIG. 2. The control unit 30 is, for example, a microcomputer. Although not illustrated, the control unit 30 includes a memory storing a program and a central processing unit (CPU) performing processing based on the program. Set temperature, set humidity, set air direction, and set air volume input through the operation unit 32 are stored in the memory of the control unit 30.

As illustrated in FIG. 3, the control unit 30 includes an estimation unit 51 that estimates thermal sensation of persons detected by the human body detection unit 23, and a control unit 52 that controls a refrigeration cycle of the refrigerant circuit 40 based on the thermal sensation of all of the persons estimated by the estimation unit 51, the air temperature, and the set temperature. The CPU executes the program to realize the estimation unit 51 and the control unit 52 in the air-conditioning apparatus 1. The thermal sensation is, for example, a thermal sensation index (predicted mean vote (PMV)). The thermal sensation index PMV is generally calculated based on the air temperature, the air humidity, airflow, radiation, and an amount of clothing and activity of a person; however, the thermal sensation index PMV is not limited thereto in Embodiment 1.

The estimation unit 51 calculates air speed of air blowing against each of all the detected persons from the positions, and the air direction and the air volume to each of the positions, and estimates thermal sensation PV from the calculated air speed to each of all the detected persons. The person has a feeling of being exposed to a strong flow of air as the air speed is large. Therefore, the feeling of being exposed to a flow of air is proportional to the air speed. A parameter used by the estimation unit 51 to estimate the thermal sensation PV is not limited to the air speed, and one or more of the air temperature Tr, the blowout temperature, and the air humidity may be combined. An equation to calculate the thermal sensation PV from the parameter values including the air speed is stored in the memory of the control unit 30.

The control unit 52 controls the flow switching device 12 based on the operation mode such as the cooling operation and the heating operation, to thereby switch a flow direction of the refrigerant circulating through the refrigerant circuit 40. The control unit 52 controls the rotation speed of each of the compressor 11 and the air volume adjustment unit 24 and an opening degree of the expansion device 21 such that the air temperature Tr is coincident with the set temperature Ts within a prescribed range. Further, the control unit 52 corrects the set temperature or the air temperature by using the thermal sensation of all of the persons estimated by the estimation unit 51. The control unit 52 may use any of the human bodies and the positions of the human bodies detected by the human body detection unit 23, the blowout temperature, the floor temperature, and the air humidity for control of the refrigeration cycle without limitation to the air temperature Tr.

Although not illustrated in FIG. 2, a fan that supplies outdoor air to the heat source-side heat exchanger 13 may be provided in the heat source-side unit 10. Further, a temperature detection unit that measures temperature of the refrigerant may be provided in each of the heat source-side heat exchanger 13 and the load-side heat exchanger 22. In this case, the control unit 52 may control a degree of sub-cooling and a degree of superheat by using the temperature measured by these temperature detection units. Further, in Embodiment 1, the case where the floor temperature detection unit 28 is provided in the load-side unit 20 will be described; however, in a case where the human body detection unit 23 is an infrared sensor, the human body detection unit 23 may detect the floor temperature. FIG. 1 and FIG. 2 each illustrate the configuration in the case where the control unit 30 is provided in the load-side unit 20. Alternatively, the control unit 30 may be provided in the heat source-side unit 10.

Figure 4:
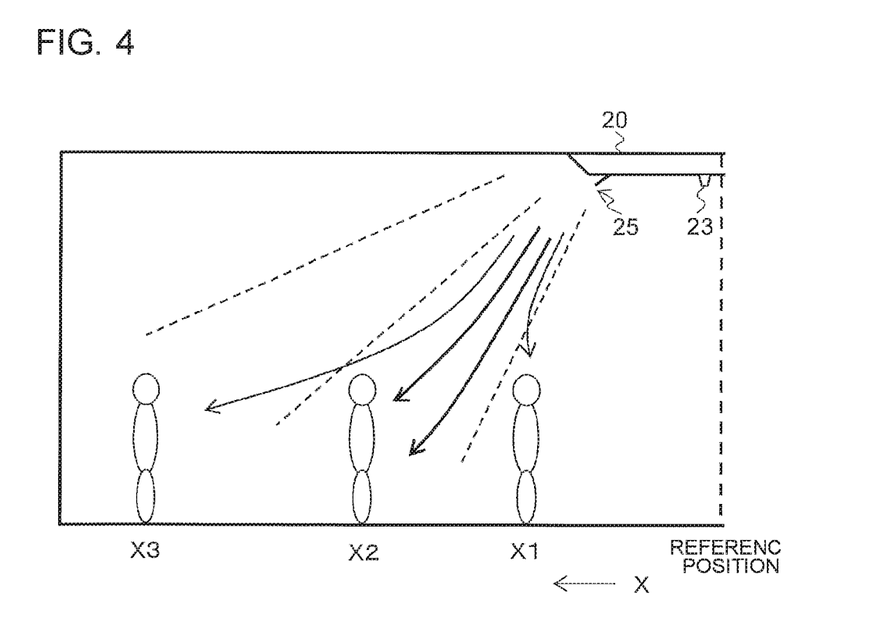
FIG. 4 is a diagram explain relationship between person positions and thermal sensation in a room.

Estimation of the thermal sensation for each of the plurality of persons in the room by the estimation unit 51 will be described. FIG. 4 is a diagram explaining relationship between the positions of the persons and the thermal sensation in the room. To simplify the description, estimation in a case where one of the two air outlets illustrated in FIG. 1 is used will be described.

FIG. 4 illustrates a case where the air direction adjustment unit 25 can adjust the air direction to three directions, and the person using the air-conditioning apparatus 1 can select one of the three directions as the set air direction. In FIG. 4, a range with a feeling of being exposed to a strong flow of air is illustrated for each of the directions while being divided by dashed lines. As illustrated in the example in FIG. 4, in a case where three persons are present in the room, the human body detection unit 23 detects presence of a person at each of distances X1, X2, and X3 in an X-axis arrow direction with the position of the load-side unit 20 as the reference position. The control unit 52 adjusts the air direction adjustment unit 25 such that the air direction is coincident with the set air direction instructed through the operation unit 32. In this example, the air is directed to the person at the position X2. In this case, the air blown out from the load-side unit 20 directly blows against the person at the position X2. Therefore, the person at the position X2 has a feeling of being exposed to a strong flow of air. In contrast, the air blown out from the load-side unit 20 does not directly blow against the two persons at the positions X1 and X3. Therefore, the persons at the positions X1 and X3 have a feeling of being exposed to a weak flow of air. Further, the three persons at the positions X1 to X3 have a feeling of being exposed to a strong flow of air as the air volume blown out from the load-side unit 20 is large. In contrast, the three persons at the positions X1 to X3 have a feeling of being exposed to a weak flow of air as the air volume blown out from the load-side unit 20 is small. Accordingly, even when the plurality of persons are present in the room, the estimation unit 51 can estimate the thermal sensation PV from the position, the air direction, and the air volume for each of all the persons.

Figure 5:
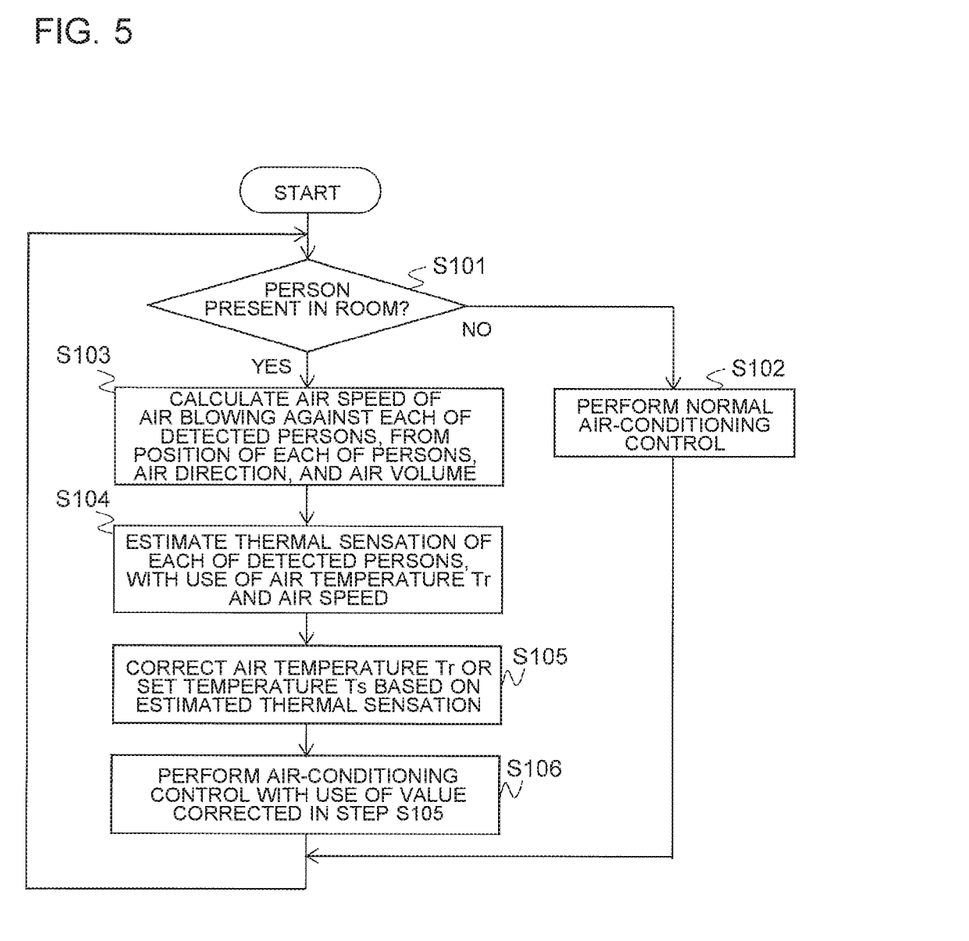
FIG. 5 is a flowchart illustrating an operation procedure of the air-conditioning apparatus illustrated in FIG. 1.

Next, an operation procedure of the air-conditioning apparatus 1 illustrated in FIG. 1 will be described. FIG. 5 is a flowchart illustrating the operation procedure of the air-conditioning apparatus illustrated in FIG. 1. In this example, the set temperature, the air direction, and the air volume have been set.

When the air-conditioning apparatus 1 starts air-conditioning operation, the human body detection unit 23 determines whether a person is present in the room (step S101). In a case where no person is present in the room as a result of the determination in step S101, the estimation unit 51 notifies the control unit 52 that estimation of the thermal sensation PV is not performed. The control unit 52 performs normal air-conditioning control (step S102). For example, the control unit 52 controls the compressor 11, the air volume adjustment unit 24, and the expansion device 21 such that the air temperature Tr is coincident with the set temperature Ts within a prescribed range. At this time, the control unit 52 may use not only the set temperature Ts but also the humidity as the control parameters.

In a case where a person is present in the room as the result of the determination in step S101, the estimation unit 51 calculates the air speed of the air blowing against the person, from information on the position of the person, the air direction, and the air volume. In a case where a plurality of persons are present in the room, the estimation unit 51 calculates the air speed for each of all the detected persons (step S103). Subsequently, the estimation unit 51 estimates the thermal sensation PV of each of the detected persons by using the air temperature Tr and the air speed (step S104). More specifically, the estimation unit 51 substitutes the values of the air temperature Tr and the air speed as the parameters in a thermal sensation calculation equation to calculate the thermal sensation PV.

The estimation unit 51 notifies the control unit 52 of the estimated thermal sensation PV of all of the persons detected by the human body detection unit 23. The control unit 52 corrects the value of the air temperature Tr or the set temperature Ts based on the thermal sensation PV of all of the detected persons (step S105). Further, the control unit 52 controls the refrigeration cycle of the refrigerant circuit 40 by using the value corrected in step S105 (step S106). Thereafter, the control unit 52 may display, on the display unit 31 of the operation unit 32, execution of the air-conditioning control based on the thermal sensation of all of the detected persons. In this case, even if a person who feels cold or hot is present in the room, the person can know that the indoor environment is being improved, by viewing contents displayed on the display unit 31.

According to the control illustrated in FIG. 5, in the case where the plurality of persons are present in the room, the thermal sensation of all of the detected persons are estimated, and the value of the air temperature Tr or the set temperature Ts is corrected based on the thermal sensation of all of the detected persons. As a result, the refrigeration cycle is controlled with the corrected air temperature Tr or the corrected set temperature Ts, and make all of the persons in the room more comfortable in respect of thermal sensation.

Figure 6:
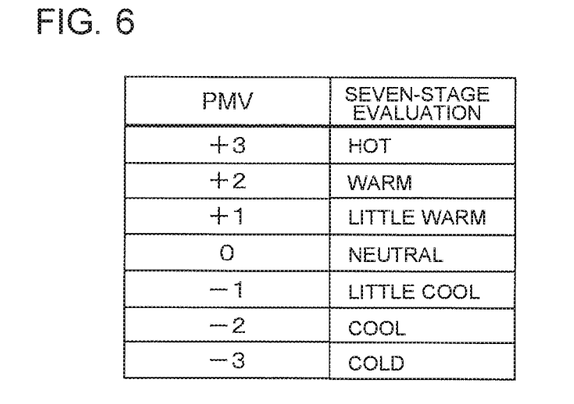
FIG. 6 is an evaluation table of a common thermal sensation index PMV.

A specific example of the procedure in steps S104 to S106 illustrated in FIG. 5 will be described. FIG. 6 is an evaluation table of the common thermal sensation index PMV. As illustrated in FIG. 6, in a case of the common thermal sensation index PMV, the thermal sensation index PMV about the thermal sensation of a person is ranked into 7 stages. For example, a range of the thermal sensation index PMV from −0.5 to +0.5 is a neutral range where a person feels comfortable. In the air-conditioning apparatus 1 of Embodiment 1, a table similar to the table illustrated in FIG. 6 is stored in the memory of the control unit 30 as an evaluation table of the thermal sensation PV estimated by the estimation unit 51.

Figure 7:
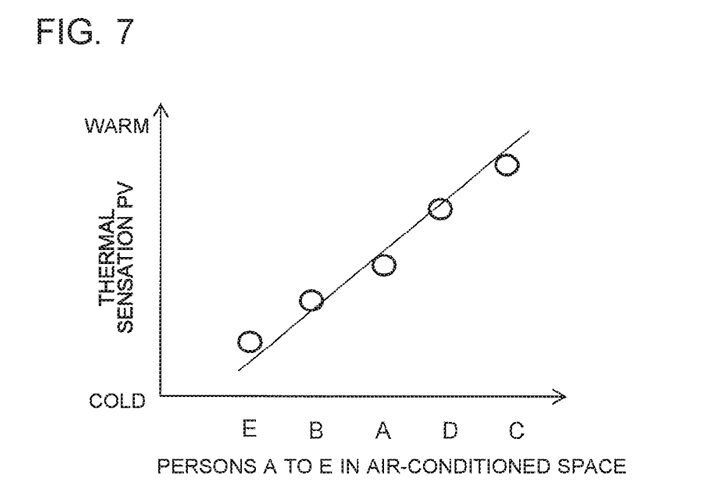
FIG. 7 is an explanatory graph illustrating thermal sensation estimated by an estimation unit illustrated in FIG. 3.

FIG. 7 is an example of a graph illustrating the thermal sensation estimated by the estimation unit illustrated in FIG. 3. It is assumed that persons A to E are present in the room as the air-conditioned space of the air-conditioning apparatus 1, and FIG. 7 illustrates the thermal sensation of the persons A to E in order from the lowest thermal sensation. Referring to FIG. 7, among the persons A to E, a person with the highest thermal sensation PV is the person C, and a person with the lowest thermal sensation PV is the person E. In the case where the plurality of persons are present in the room, the estimation unit 51 estimates the thermal sensation PV for each of the persons A to E. After step S104 illustrated in FIG. 5, the estimation unit 51 compares the thermal sensation PV of all of the detected persons, and notifies the control unit 52 of highest thermal sensation PVh as the highest thermal sensation PV and lowest thermal sensation PVl as the lowest thermal sensation PV.

Figure 8:
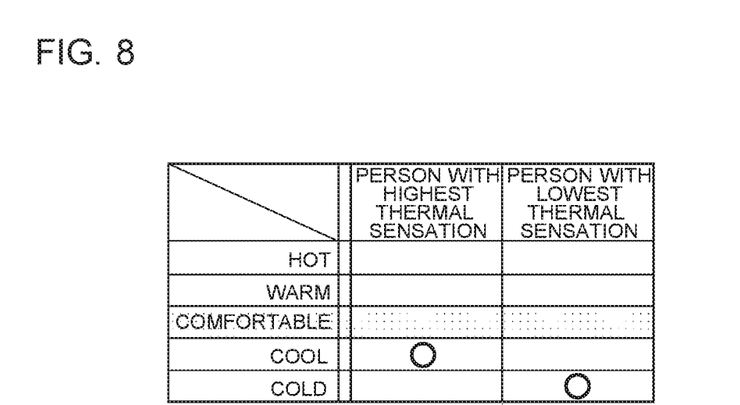
FIG. 8 is a table illustrating an example in a case where the thermal sensation estimated by the estimation unit illustrated in FIG. 3 is applied to the evaluation table.

FIG. 8 is a table illustrating an example in a case where the thermal sensation estimated by the estimation unit illustrated in FIG. 3 is applied to the evaluation table. In the table illustrated in FIG. 8, a range where the person feels comfortable corresponds to the neutral range illustrated in FIG. 6. FIG. 8 illustrates that the highest thermal sensation PVh is in an evaluation rank colder than the neutral range. The control unit 52 applies the highest thermal sensation PVh and the lowest thermal sensation PVl to the evaluation table.

In a case where the highest thermal sensation PVh is in an evaluation rank colder than the neutral range, the control unit 52 determines that all of the persons in the room feel cold. Accordingly, in step S105 illustrated in FIG. 5, the control unit 52 corrects the set temperature Ts to temperature higher than the current temperature, or corrects the air temperature Tr to temperature lower than the current temperature. A correction value in the case where the set temperature Ts is corrected to the temperature higher than the current temperature or the air temperature Tr is corrected to the temperature lower than the current temperature is desirably equal to difference between the neutral range of the comfortable evaluation rank illustrated in FIG. 8 and the highest thermal sensation PVh.

In the case where the set temperature Ts has been corrected to the temperature higher than the current temperature, the control unit 52 controls, in step S106, the rotation speed of the compressor 11 and the opening degree of the expansion device 21 such that the air temperature Tr is coincident with the corrected set temperature Ts. In the case where the air temperature Tr has been corrected to the temperature lower than the current temperature, the control unit 52 controls, in step S106, the rotation speed of the compressor 11 and the opening degree of the expansion device 21 such that the corrected air temperature Tr is coincident with the set temperature Ts.

Figure 9:
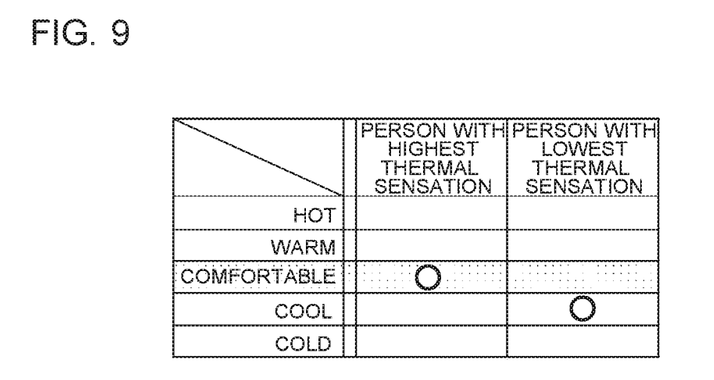
FIG. 9 is an evaluation table illustrating transition of the thermal sensation illustrated in FIG. 8 in a case where control in step S106 illustrated in FIG. 5 is performed.

FIG. 9 is an evaluation table illustrating transition of the thermal sensation illustrated in FIG. 8 in a case where the control in step S106 illustrated in FIG. 5 is performed. FIG. 9 illustrates that, when the control unit 52 performs the control in step S106 illustrated in FIG. 5, the highest thermal sensation PVh illustrated in FIG. 8 is settled within the neutral range, and the lowest thermal sensation PVl is made closer to the neutral range. When comparing FIG. 8 and FIG. 9, the thermal sensation PV of all of the persons in the room shifts to the high temperature side to a degree not making the person with the highest thermal sensation PVh feel too hot and uncomfortable among all of the persons in the room. As a result, the thermal sensation of all of the persons in the room shifts toward the more comfortable neutral range.

Figure 10:
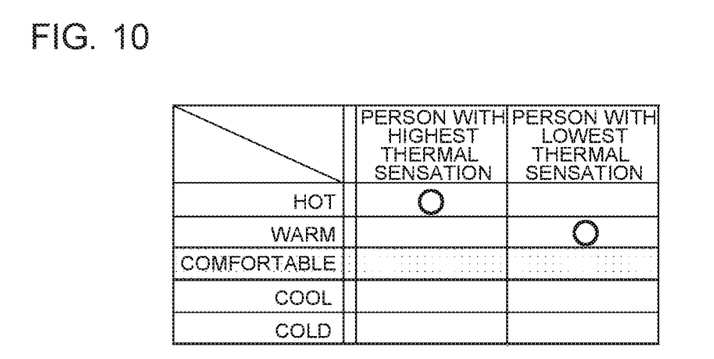
FIG. 10 is a table illustrating another example in the case where the thermal sensation estimated by the estimation unit illustrated in FIG. 3 is applied to the evaluation table.

Next, another specific example of the procedure in steps S104 to S106 illustrated in FIG. 5 will be described. FIG. 10 is a table illustrating another example in a case where the thermal sensation estimated by the estimation unit illustrated in FIG. 3 is applied to the evaluation table. FIG. 10 illustrates that the lowest thermal sensation PVl is in an evaluation rank hotter than the neutral range. The control unit 52 applies the highest thermal sensation PVh and the lowest thermal sensation PVl to the evaluation table. In a case where the lowest thermal sensation PVl is in an evaluation rank hotter than the neutral range, the control unit 52 determines that all of the persons in the room feel hot. Accordingly, in step S105 illustrated in FIG. 5, the control unit 52 corrects the set temperature Ts to a temperature lower than the current temperature, or corrects the air temperature Tr to a temperature higher than the current temperature. A correction value in the case where the set temperature Ts is corrected to the temperature lower than the current temperature or the air temperature Tr is corrected to the temperature higher than the current temperature is desirably equal to difference between the neutral range of the comfortable evaluation rank illustrated in FIG. 8 and the lowest thermal sensation PVl.

In the case where the set temperature Ts has been corrected to the temperature lower than the current temperature, the control unit 52 controls, in step S106, the rotation speed of the compressor 11 and the opening degree of the expansion device 21 such that the air temperature Tr is coincident with the corrected set temperature Ts. In the case where the air temperature Tr has been corrected to the temperature higher than the current temperature, the control unit 52 controls, in step S106, the rotation speed of the compressor 11 and the opening degree of the expansion device 21 such that the corrected air temperature Tr is coincident with the set temperature Ts.

Figure 11:
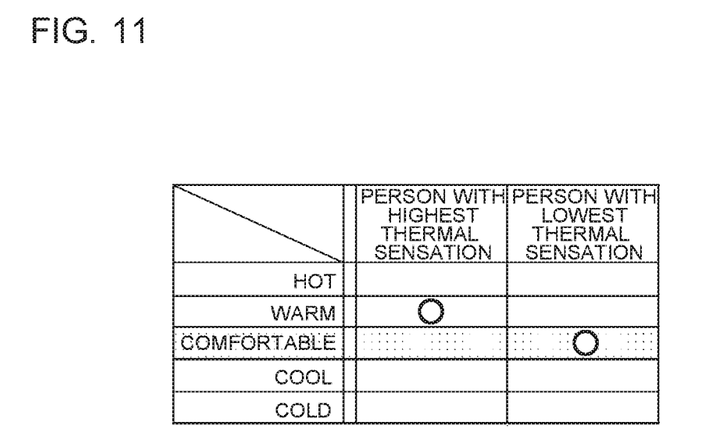
FIG. 11 is an evaluation table illustrating transition of the thermal sensation illustrated in FIG. 10 in the case where the control in step S106 illustrated in FIG. 5 is performed.

FIG. 11 is an evaluation table illustrating transition of the thermal sensation illustrated in FIG. 10 in the case where the control in step S106 illustrated in FIG. 5 is performed. FIG. 11 illustrates that, when the control unit 52 performs the control in step S106 illustrated in FIG. 5, the lowest thermal sensation PVl illustrated in FIG. 10 is settled within the neutral range, and the highest thermal sensation PVh is made closer to the neutral range. Comparing FIG. 10 and FIG. 11, the thermal sensation PV of all of the persons in the room shifts to the low temperature side to a degree not making the person with the lowest thermal sensation PVl feel too cold and uncomfortable among all of the persons in the room. As a result, the thermal sensation of all of the persons in the room transits toward the more comfortable neutral range.

Note that the case where the estimation unit 51 estimates the thermal sensation IN by using the air speed and the air temperature Tr in step S104 illustrated in FIG. 5 has been described; however, the parameters used for estimation of the thermal sensation PV is not limited to the air speed and the air temperature Tr. To more accurately estimate the thermal sensation PV, selection of the parameters used for estimation of the thermal sensation PV is important.

For example, when the air blown out from the load-side unit 20 directly blows against a person in the cooling operation, the person feels cooler or colder than the ambient air temperature, and blowing of air against the person largely influences the thermal sensation PV. In contrast, in the heating operation, when the blowout air that is high in temperature blows against the person, the person feels warmer than the ambient temperature, whereas when the blowout air that is low in temperature blows against the person, the person feels colder than the ambient temperature. Accordingly, as the parameters used for estimation of the thermal sensation, at least the air speed is used in the cooling operation, and the air speed and the blowout temperature are used in the heating operation, which allows for more accurate estimation of the thermal sensation PV.

Further, as the parameters used for estimation of the thermal sensation PV, the estimation unit 51 may combine parameters of one or more of the blowout air, the floor temperature, and the air humidity, in addition to the air speed of the air blowing against the person. For example, it is considered that the higher air humidity makes the person feel hot. Accordingly, in a case where the air humidity is higher than or equal to a predetermined threshold, the estimation unit 51 adds the air humidity to the parameters used for estimation of the thermal sensation PV. Further, the thermal sensation of a sitting person is largely influenced by radiant heat from the floor, as compared with a standing person. Accordingly, in a case where the human body detection unit 23 detects a person near the floor, the estimation unit 51 adds the floor temperature to the parameters used for estimation of the thermal sensation PV. As described above, the estimation unit 51 can estimate the thermal sensation of all of the persons in the room by combining the parameters used for estimation of the thermal sensation PV more accurately.

The air-conditioning apparatus 1 of Embodiment 1 includes the estimation unit 51 that estimates the thermal sensation of the persons detected by the human body detection unit 23, and the control unit 52 that corrects the value of the air temperature or the set temperature based on the thermal sensation of all of the detected persons estimated by the estimation unit 51, and controls the refrigeration cycle.

According to Embodiment 1, when the plurality of persons in the air-conditioned space are detected, the thermal sensation of all of the detected persons is estimated, the value of the air temperature or the set temperature is corrected based on the thermal sensation of all of the detected persons, and the refrigeration cycle is controlled with the corrected value. This makes it possible to make all of the detected persons feel more comfortable in respect of thermal sensation.

A related art air-conditioning apparatus estimates the thermal sensation by using only parameters at a representative position in the air-conditioned space, and performs control to obtain more comfortable estimated thermal sensation range. Therefore, in a case where a plurality of persons are present in one air-conditioned space, the existing air-conditioning apparatus cannot perform air-conditioning control matched to the thermal sensation of each of the persons. Even in one air-conditioned space, the thermal sensation is different between a person in a perimeter zone close to a window, a wall, or the like and a person in an interior zone near a center. The thermal sensation is varied depending on a person even in one room, for example, a person near a window feels hotter by solar radiation, and a person near an air outlet of the air-conditioning apparatus feels colder due to the feeling of being exposed to a flow of air. Therefore, control to transit the thermal sensation of an optionally-selected one person to feel comfortable may make the other persons feel uncomfortable, and it is difficult to make all of the persons feel comfortable. In contrast, in Embodiment 1, the thermal sensation is estimated for the plurality of persons in the one air-conditioned space, and the air-conditioning control reflecting the estimated thermal sensation is performed. Therefore, it is possible to make all of the persons feel more comfortable in respect of thermal sensation without making any person feel uncomfortable.

For example, in Embodiment 1, in the case where the thermal sensation of all of the detected persons are compared and the highest thermal sensation PVh is lower than the neutral range, the refrigeration cycle is controlled such that the highest thermal sensation PVh is settled within the neutral range. This is because it is considered that, in the case where the highest thermal sensation PVh is lower than the neutral range, all of the persons in the air-conditioned space feel cold. In this case, controlling the refrigeration cycle after the set temperature is corrected to the temperature higher than the current temperature or the air temperature Tr is corrected to the temperature lower than the current temperature makes it possible to make the thermal sensation of all of the persons closer to the neutral range without making any person feel uncomfortable.

Further, in Embodiment 1, when the thermal sensations of all of the detected persons are compared and the lowest thermal sensation PVl is higher than the neutral range, the refrigeration cycle is controlled such that the lowest thermal sensation PVl is settled within the neutral range. This is because it is considered that, in the case where the lowest thermal sensation PVl is higher than the neutral range, all of the persons in the air-conditioned space feel hot. In this case, controlling the refrigeration cycle after the set temperature is corrected to the temperature lower than the current temperature or the air temperature Tr is corrected to the temperature higher than the current temperature makes it possible to make the thermal sensation of all of the persons closer to the neutral range without making any person feel uncomfortable.

In Embodiment 1, in the case where the control to settle the highest thermal sensation PVh within the neutral range is performed, the correction value of the set temperature Ts or the air temperature Tr is set to the difference between the highest thermal sensation PVh and the neutral range. In this case, it is possible to prevent the air-conditioning apparatus 1 from excessively cooling the air-conditioned space. Further, in the case where the control to settle the lowest thermal sensation PVl in the neutral range is performed, the correction value of the set temperature Ts or the air temperature Tr is set to the difference between the lowest thermal sensation PVl and the neutral range. In this case, it is possible to prevent the air-conditioning apparatus 1 from excessively heating the air-conditioned space. Preventing excessive cooling and excessive heating in the air-conditioned space makes it possible not only to improve comfortability but also to reduce power consumption. Further, an operation load of the air-conditioning apparatus 1 is reduced, and a service life of the air-conditioning apparatus 1 can be prolonged.

In the case where the air-conditioning apparatus is controlled based on the thermal sensation, it is important to estimate the thermal sensation more accurately. Whether the blowout air directly blows against a person has high correlation with the thermal sensation of the person. In particular, in the cooling operation, whether the blowout air directly blows against the person has high correlation with the thermal sensation of the person. Therefore, in Embodiment 1, in the case where the air-conditioning apparatus 1 performs the cooling operation, it is desirable to use the air speed of the air blowing against the person for estimation of the thermal sensation of the person. As a result, the estimation unit 51 can estimate the thermal sensation in the cooling operation more accurately. Further, in the heating operation, the person feels the warm air to be warmer, and feels not-warm air to be cold. Therefore, in Embodiment 1, in the case where the air-conditioning apparatus 1 performs the heating operation, it is desirable to use the blowout temperature and the air speed of the air blowing against the person for estimation of the thermal sensation of the person. As a result, the estimation unit 51 can estimate the thermal sensation more accurately in the heating operation. The estimation unit 51 selects the parameters used for estimation of the thermal sensation of the person based on environment in the above-described manner, which makes it possible to perform control using the thermal sensation more accurately.

REFERENCE SIGNS LIST 1 air-conditioning apparatus 10 heat source-side unit 11 compressor 12 flow switching device 13 heat source-side heat exchanger 20 load-side unit 21 expansion device 22 load-side heat exchanger 23 human body detection unit 24 air volume adjustment unit 25 air direction adjustment unit 26 air temperature detection unit 27 blowout temperature detection unit 28 floor temperature detection unit 29 humidity detection unit 30 control unit 31 display unit 32 operation unit 40 refrigerant circuit 51 estimation unit 52 control unit

The invention claimed is:
1. An air-conditioning apparatus, comprising:
an air temperature detection unit configured to detect air temperature in an air-conditioned space;

a fan configured to adjust a blowout air volume;

a louver configured to adjust a direction of blowout air:

an infrared sensor configured to detect human bodies and the positions of human bodies in the air-conditioned space; and a controller configured to estimate thermal sensation of persons detected by the infrared sensor; and correct a value of the air temperature or set temperature based on the thermal sensation of all of the detected persons estimated by the estimation unit, and to control a refrigeration cycle by using the corrected value, wherein the controller calculates air speed of air blowing against each of all the detected persons from the positions, and the air direction and the air volume to each of the positions, and estimates the thermal sensation by using values of parameters including the calculated air speed.

2. The air-conditioning apparatus of claim 1, wherein, in a case where highest thermal sensation of the thermal sensation of all of the detected persons is lower than a neutral range, the controller controls the refrigeration cycle to settle the highest thermal sensation within the neutral range.

3. The air-conditioning apparatus of claim 2, wherein the controller corrects the set temperature to a value higher by a difference between the neutral range and the highest thermal sensation, or corrects the air temperature to a value lower by the difference.

4. The air-conditioning apparatus of claim 1, wherein, in a case where lowest thermal sensation of the thermal sensation of all of the detected persons is higher than a neutral range, the controller controls the refrigeration cycle to settle the lowest thermal sensation within the neutral range.

5. The air-conditioning apparatus of claim 4, wherein the controller corrects the set temperature to a value lower by difference between the neutral range and the lowest thermal sensation, or corrects the air temperature to a value higher by the difference.

6. The air-conditioning apparatus of claim 1, further comprising a blowout temperature detection unit configured to detect a blowout temperature, wherein the controller estimates the thermal sensation by including the blowout temperature in the parameters.

7. The air-conditioning apparatus of claim 1, wherein the infrared sensor has a floor temperature, and the controller estimates the thermal sensation by including the floor temperature in the parameters.

8. The air-conditioning apparatus of claim 1, further comprising a humidity detection unit configured to detect air humidity in the air-conditioned space, wherein the controller estimates the thermal sensation by including the air humidity in the parameters.

9. The air-conditioning apparatus of claim 1, further comprising an operation unit including a display unit, wherein after the controller controls the refrigeration cycle by using the corrected value of the air temperature or the set temperature, the control unit displays, on the display unit, execution of air-conditioning control based on the thermal sensation of all of the detected persons.

* * * * *